United States Patent
Zhaoui et al.

(10) Patent No.: US 12,498,097 B1
(45) Date of Patent: Dec. 16, 2025

(54) HOOD ORNAMENT LAMP HOUSING

(71) Applicants: FCA US LLC, Auburn Hills, MI (US); Stellantis Auto SAS, Poissy (FR); Flex-N-Gate, Audincourt (FR)

(72) Inventors: Zakariae Zhaoui, Audincourt (FR); Aslam Adam, Auburn Hills, MI (US)

(73) Assignees: FCA US LLC, Auburn Hills, MI (US); Stellantis Auto SAS, Poissy (FR); Flex-N-Gate, Audincourt (FR)

( * ) Notice: Subject to any disclaimer, the term of this patent is extended or adjusted under 35 U.S.C. 154(b) by 0 days.

(21) Appl. No.: 18/959,880

(22) Filed: Nov. 26, 2024

(51) Int. Cl.
*F21V 19/00* (2006.01)
*F21S 41/141* (2018.01)
*F21S 41/20* (2018.01)
*F21S 45/10* (2018.01)

(52) U.S. Cl.
CPC ............. *F21S 45/10* (2018.01); *F21S 41/141* (2018.01); *F21S 41/20* (2018.01); *F21V 19/004* (2013.01)

(58) Field of Classification Search
CPC .................................................. F21V 19/004
See application file for complete search history.

(56) References Cited

U.S. PATENT DOCUMENTS

| 5,477,428 A | * | 12/1995 | Brown | ..................... B60Q 3/30 |
| | | | | 200/61.51 |
| 2024/0270159 A1 | * | 8/2024 | Wehunt | ................ B60Q 1/2696 |

* cited by examiner

*Primary Examiner* — Sean P Gramling
(74) *Attorney, Agent, or Firm* — Jeremy J. Klobucar

(57) ABSTRACT

A hood ornament lamp housing is provided to provide illumination through a cut out area in an outer vehicle hood. The lamp housing has first and second sections. The first housing section houses electrical components such as a printed circuit board. The first housing section includes a mounting flange configured to connect the first housing section with an inner hood component. The second section houses electrical components such as LED lamps. The second section contains mounting tabs that engage projections connected with an inner hood component to clip the lamp housing in a desired location relative to the outer hood. The lamp housing further includes a lens for disposition in the cut out area of an outer hood to provide illumination.

17 Claims, 4 Drawing Sheets

HOOD ORNAMENT LAMP HOUSING

FIELD

The present disclosure relates to a lamp housing having clips for attachment to a vehicle hood.

BACKGROUND

Vehicles sometimes contain non-electrical hood ornaments which may have a relatively flat profile or may extend upward from an area near the front of the vehicle hood. Such hood ornaments are typically ornamental and may include trademarks relating to the type or brand of vehicle.

SUMMARY

In at least some implementations, a lamp housing, configured to be connected to a vehicle hood component, is provided. The lamp housing has a first housing section and a second housing section. The second housing section extends from the first housing section to a distal end. The second housing section having a channel defined by a base and at least one side wall extending transversely to the base. The at least one side wall supports a first tab. The first tab is configured to be received in an opening of a projection on a vehicle hood component to thereby connect the housing with a vehicle hood component.

In at least some implementations, a lamp housing configured to be connected to a vehicle hood component is provided. The lamp housing comprises a first housing section and a second housing section extending from the first housing section to a distal end. The first housing section defines a cavity configured to receive electrical components. The first housing further includes a mounting flange extending outwardly therefrom opposite to the direction of the second housing section. The second housing section comprises a channel defined by a base and a pair of side walls spaced apart from one another and extending transversely to the base. The second housing section has a mounting block depending from the base adjacent the distal end. Each of the pair of side walls supports a first tab. The first tab is configured to be received in an opening of a projection on a vehicle hood component to thereby connect the housing with a vehicle hood component. The lamp housing further comprises a lens disposed over the channel and configured to be coupled with the side walls.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
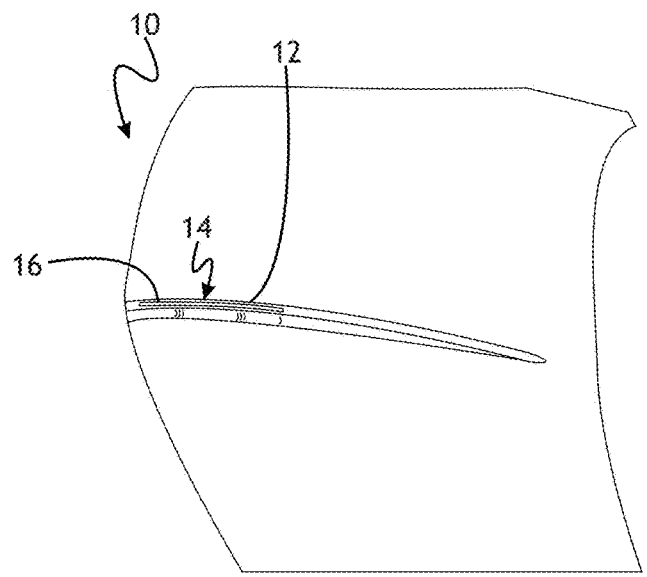
FIG. 1 is a top view of a vehicle hood.

FIG. 1 shows a vehicle hood 10. The vehicle hood 10 has cut out area 12. The cut out area 12 provides an area through which light can be provided or transmitted. FIG. 1 also shows a lamp housing generally indicated at 14. More specifically, a lens 16 of a lamp housing 14 is shown.

Figure 2:
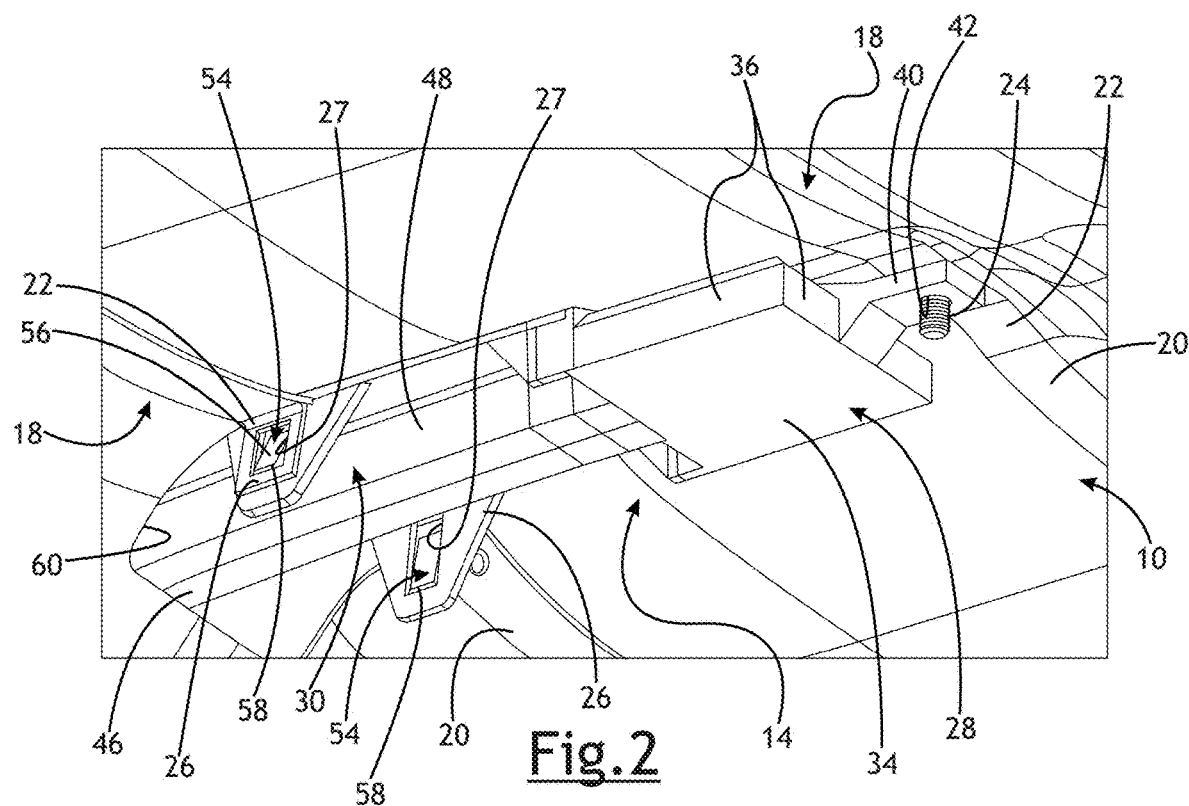
FIG. 2 is a perspective view of a rear portion of an implementation of a lamp housing.

The lamp housing 14 is also shown in FIG. 2. FIG. 2 shows the underside of a vehicle hood 10. The vehicle hood 10 includes an inner vehicle hood component generally indicated at 18 and including structural members 20 that provide strength and support to the vehicle hood 10. The structural members 20 can be configured to provide mounting areas 22 to mount the lamp housing 14. As shown in FIG. 2, the mounting areas may include a bolt 24 and projections 26. In an implementation, a pair of projections 26 are provided. The projections 26 may include an opening 27 therethrough.

The lamp housing 14 has a first housing section generally indicated at 28 and a second housing section generally indicated at 30. The first housing section 28 has a receptacle for receiving electrical components, such as a printed circuit board (PCB) 32. More specifically, in an implementation, the first housing section 28, has a bottom wall 34 and a plurality of side walls 36 extending transversely to the bottom wall 34. The bottom wall 34 and side walls 36 define a cavity 38. The PCB 32 can be disposed in the cavity 38.

The first housing section 28 may further include a mounting flange 40. The mounting flange 40 extends from one of the side walls 36. The mounting flange 40 may include a hole 42 therethrough. The hole 42 can receive the bolt 24 that is on mounting area 22 of the inner vehicle hood component 18. A nut can be secured to the bold 24 to thereby connect the lamp housing 14 with the inner vehicle hood component 18. While the bolt 24 is shown to extend from the mounting area 22 of the inner vehicle hood component 18 and is received within the hole 42, it will be appreciated that the bolt 24 may be disposed on the mounting flange 40 and the hole may be in the mounting area 22. It will further be appreciated that other suitable fasteners may be used in place of bolt 24 and nut. By way of non-limiting example another suitable faster may comprise a clevis pin, not shown.

The second housing section 30 is coupled with the first housing section 28. The second housing section extends from the first housing section 28 to a distal end 44. The second housing section 30 has a base 46 and at least one side wall 48. In an implementation, the second housing section 30 has a pair of side walls 48 extending transversely to the base 46. The base 46 and side walls 48 define a channel 50. The channel 50 is for receiving electrical components, such as lighting elements 52. In implementations, the lighting elements may comprise LED lamps or bulbs or combinations thereof. It will be appreciated that any suitable lighting element may be used. In an implementation, the second housing section 30 extends in a direction that is opposite to the direction of the mounting flange 40. In an implementation, the second housing section 30 is integral with the first housing section 28. In some implementations, the first housing section 28 and the second housing section 30 may be integrally formed.

The side walls 48 support a first tab generally shown at 54. The first tab 54 includes a ramped surface 56 and a ledge 58. In the implementation shown in FIG. 1, the ramped surface 56 on the first tab 54 is thicker at the bottom thereof and tapers in the direction toward the top thereof such that it is relatively thinner at the top. The ledge 58 comprises the surface of the first tab 54 that is below the relatively thicker portion of the first tab 54.

The ramped surface 56 may help facilitate mounting of the lamp housing 14 with the inner vehicle hood component 18. The openings 27 of the projections 26 may receive the first tab 54 therein. During connection of the lamp housing 14 with the inner vehicle hood component 18, the first tabs 54 are positioned below the projections 26. A force can be applied to move the second housing section 30 toward the inner vehicle hood component 18. The relatively thinner end of the ramped surface 56 engages the projection 26. As the ramped surface 56 is moved relative to the projection 26, the projection 26 is urged or flexed slightly outwardly relatively to the first tab 54. When the ramped surface 56 of the first tab 54 is located within the opening 27, the projection 26 returns to an unbiased state and the ledge 58 can engage the projection 26 to thereby releasably secure the first tab 54 with the projection 26.

With the connection made in this way, the first tab 54 and projection 26 form a clip which releasably connects the first tab 54 to the projection 26. This clip arrangement helps urge the lamp housing 14 toward the vehicle hood 10. It will be appreciated that rather than the projection 26 flexing, the ramped surface 56 may urge or flex the side wall 48 to allow the ramped surface 56 to be inserted into the opening 27 of the projection 26. Yet further, it will be appreciated that both of the projection 26 and side wall 48 may flex to allow insertion of the ramped surface 56 of the first tab 54 into the opening 27. Once the first tab 54 is inserted into the opening 27, the side wall 48 and projection 26 may return to their respective unbiased positions allowing the ledge 58 to engage the projection 27.

As seen in FIG. 2, certain implementations allow for the lamp housing 14, and more specifically, the second housing section 30 to pass through a cut-out or opening 60 in the structural members 20 of the inner vehicle hood component 18. This implementation may be necessary when structural requirements of the vehicle hood 10 requires placement of the structural members 20 in areas where it may be desirable to locate the second housing section 30.

As shown in FIG. 2, the projections 27 and first tabs 54 are located between the first housing section 28 and the distal end 44 of the second housing section 30. In some implementations, the connection between the bolt 24 and mounting flange 40 together with the connections of the first tabs 54 and projections 26 that are spaced from the distal end 44 are sufficient to retain the lamp housing 14 in its desired location relative to the cut out area 12 of the vehicle hood 10. In other implementations, it may also be desirable to provide a connection between the lamp housing 14 and the structural members 20 that is adjacent the distal end 44.

Figure 3:
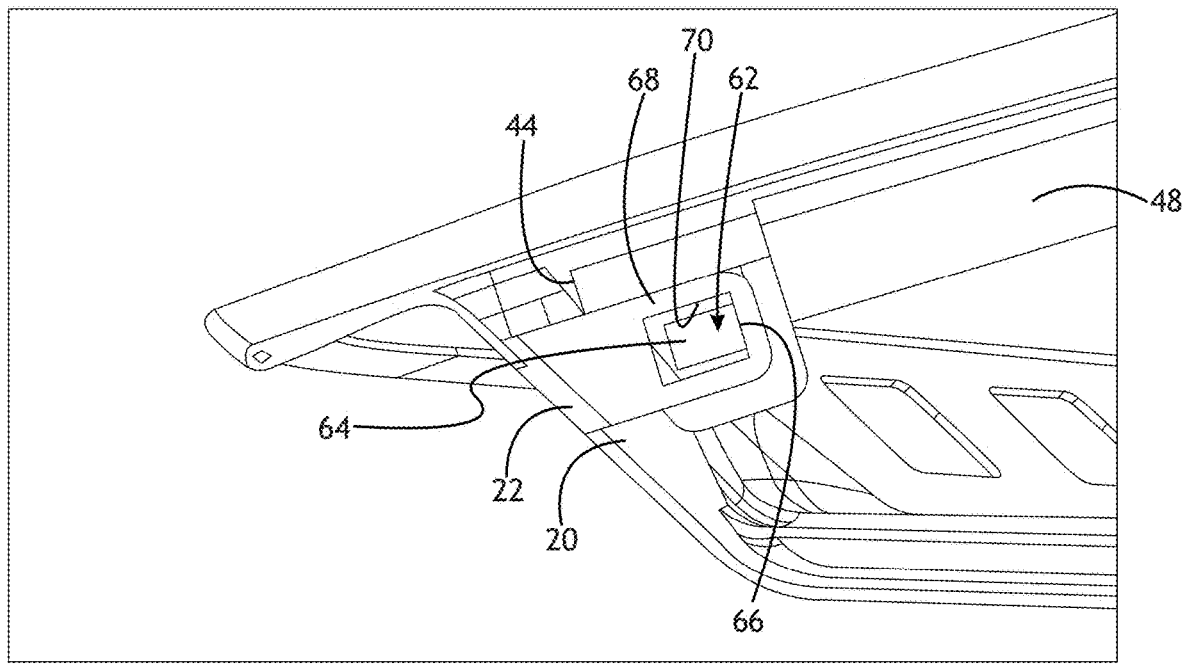
FIG. 3 is a perspective view of a front portion of an implementation of a lamp housing.

In the implementation shown in FIG. 3, a second tab, generally indicated at 62, are supported on the side wall 48 adjacent the distal end 44 of the second housing section 30. It will be appreciated that two second tabs 62 may be used, one on each side wall 48. Each of the second tabs 62 contain a ramped surface 64 and ledge 66 configured just as the first tabs 54 discussed above. The structural members 20 may also include projections 68 defining openings 70. As shown in FIG. 3, the projections 68 extend generally in a direction that aligns with the second housing section 30. It will be appreciated that the projection 68, and in some implementations, the side wall 36 may flex in the same manner set forth above in connection with the first tabs 54 and projections 26 to releasably secure the second tabs 62 with the projections 68. While only one of the second tabs 62 is shown, it will be appreciated that second tabs 62 and projections 68 may be located on the opposite side wall and structural member 20, respectively, to provide a pair of clips adjacent the distal end.

To secure the lamp housing 14, which may contain the lighting components 52 in the second housing section 30 and the PCB 32 in the cavity of the first housing section 28 and a lens 16, to the inner vehicle hood component 18, the second housing 30 may be inserted through the opening 60 in the structural members 20. The second housing section 30 can then be positioned such that the first tabs 54 are adjacent the projections 26, and the second tabs 62 are positioned adjacent the second projections 68. The first housing section 28 is positioned such that the hole 42 of the mounting flange 40 is positioned adjacent the fastener connected to the structural member 20. The second housing member is then moved to engage the second tabs 62 and the first tabs 54 with the second projections 68 and first projections 26, respectively. The ramped surfaces 56, 64 of each of the first projections 26 and second projections 68 are then moved until the first tabs 54 and second tabs 62 are inserted into the openings 27, 70 in the respective projections 26, 68. When in this position, the ledges 58, 66 engage the respective projections 26, 68 to clip the second housing section 30 into place. The first housing section 28 may be aligned such that the hole 42 of the mounting flange 40 is aligned with the bolt 24. The bolt 24 passes through the hole 42 and a nut, not shown, may be used to secure the first housing section 28 to the structural member 20. When installed in this manner, the lens 16 aligns with the cut out area 12 in the vehicle hood 10.

In order to remove the lamp housing 14 from the inner vehicle hood component 18, the nut, not shown, is removed from the bolt 24. The first projections 26 are manually flexed so as to disengage the projections 26 from the ledge 58. The second housing section 30 is then moved such that the first tabs 54 are removed from the openings 27 in the projections 26. The second projections 68 are also manually flexed so as to disengage the second projections 68 from the ledges 66 of the second tabs 62. The second housing section 30 is then moved such that the second tabs 62 are removed from the openings 70 in the second projections 68.

Another implementation of a lamp housing 14' is shown in FIGS. 4, 6, 7, and 8. In this implementation, the lamp housing 14' has a first housing section 28 and a second housing section 30. The first housing section 28 has a receptacle for receiving electrical components, such as a printed circuit board (PCB) 32. More specifically, the first housing section 28, has a bottom wall 34 and a plurality of side walls 36 extending transversely to the bottom wall 34. The bottom wall 34 and side walls 36 define a cavity 38. The PCB 32 can be disposed in the cavity 38.

The first housing section 28 may further include a mounting flange 40'. The mounting flange 40' extends from one of the side walls 36. The mounting flange 40' may include a fastener receiving portion generally indicated at 72. The fastener receiving portion 72 may have a generally cylindrical body 74 having an opening 76 therethrough for receiving a fastener. The opening 76 can receive a bolt 24 that is on mounting area 22' of the inner vehicle hood component 18. A nut, not shown, can be secured to the bolt 24 to thereby connect the lamp housing 14' with the inner vehicle hood component 18. In an implementation, the opening 76 may have a female threaded opening 76 to which the bolt 24 can be secured. While the bolt 24 is shown to extend from the mounting area 22' of the inner vehicle hood component 18 and is received within the opening 76, it will be appreciated that the bolt 24 may be disposed on the mounting flange 40' and the opening may be in the mounting area 22'. It will further be appreciated that other suitable fasteners may be used in place of bolt 24 and nut. By way of non-limiting example another suitable faster may comprise a clevis pin, not shown.

The second housing section 30 is coupled with the first housing section 28. The second housing section extends from the first housing section 28 to a distal end 44. The second housing section 30 has a base 46 and at least one side wall 48. In an implementation, the second housing section 30 has a pair of side walls 48 extending transversely to the base 46. The base 46 and side walls 48 define a channel 50. The channel 50 is for receiving electrical components, such as lighting elements 52. In an implementation, the second housing section 30 extends in a direction that is opposite to the direction of the mounting flange 40'. The second housing section 30 may be integral with the first housing section 28. In some implementations, the first housing section 28 and second 30 housing sections may be integrally formed as one piece.

Figure 6:
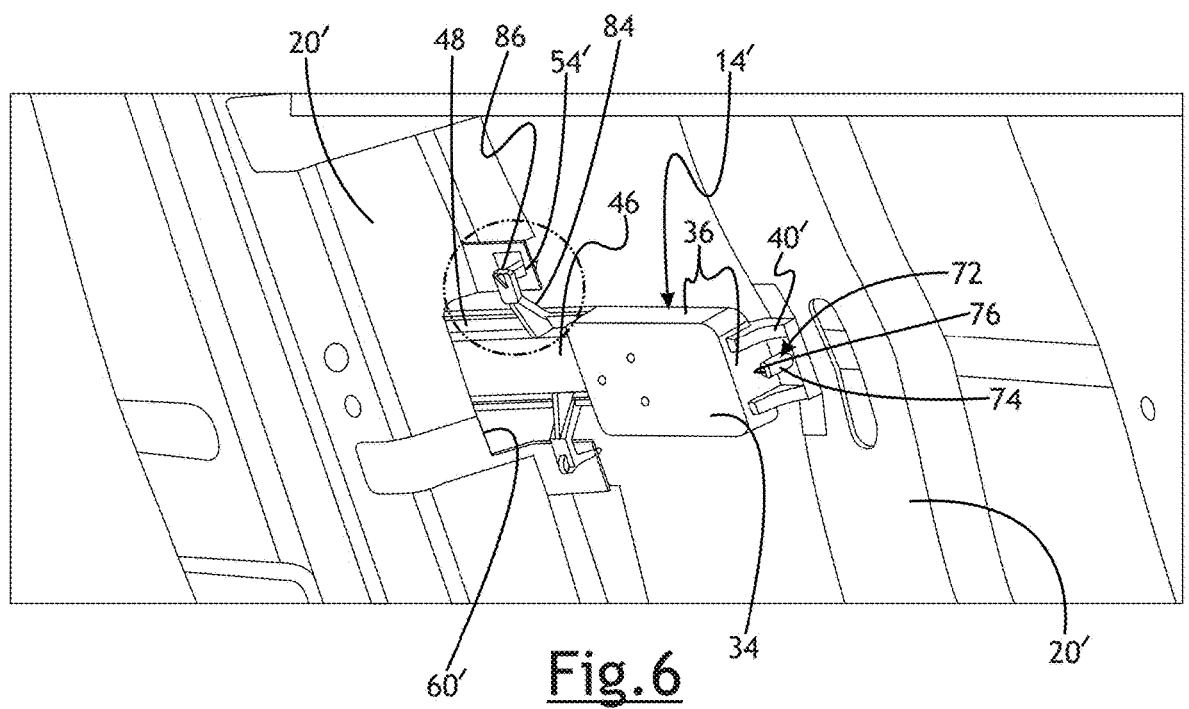
FIG. 6 is a perspective view of a rear portion of an implementation of a lamp housing.

As seen in FIG. 6, certain implementations allow for the lamp housing 14', and more specifically, the second housing section 30 to pass through a cut-out or opening 60' in the structural members 20' of the inner vehicle hood component 18. This implementation may be necessary when structural requirements of the vehicle hood 10 requires placement of the structural members 20' in areas where it may be desirable to locate the second housing section 30.

Figure 6A:
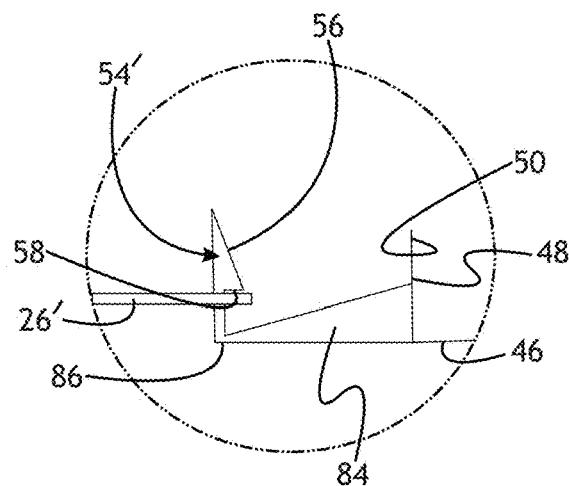
FIG. 6A is a side view of a portion of the implementation of the lamp housing of FIG. 6.

The side walls 48 of the second housing section 30 support a first tab 54'. In an implementation, an arm 84 extends from each side wall 36 and is supported thereby. The arm 84 extends from the side wall 36 to a distal end 86. The arm 84 includes a first tab 54' extending therefrom. The first tab 54' includes a ramped surface 56 and a ledge 58. In the implementation shown in FIG. 6A, the ramped surface 56 on the first tab 54' is thicker at one end thereof and tapers in the direction toward the other end thereof such that it is relatively thinner in one area which may be the top. The ledge 58 comprises the surface of the first tab 54' that is opposite the relatively thicker portion of the first tab 54'.

Figure 4:
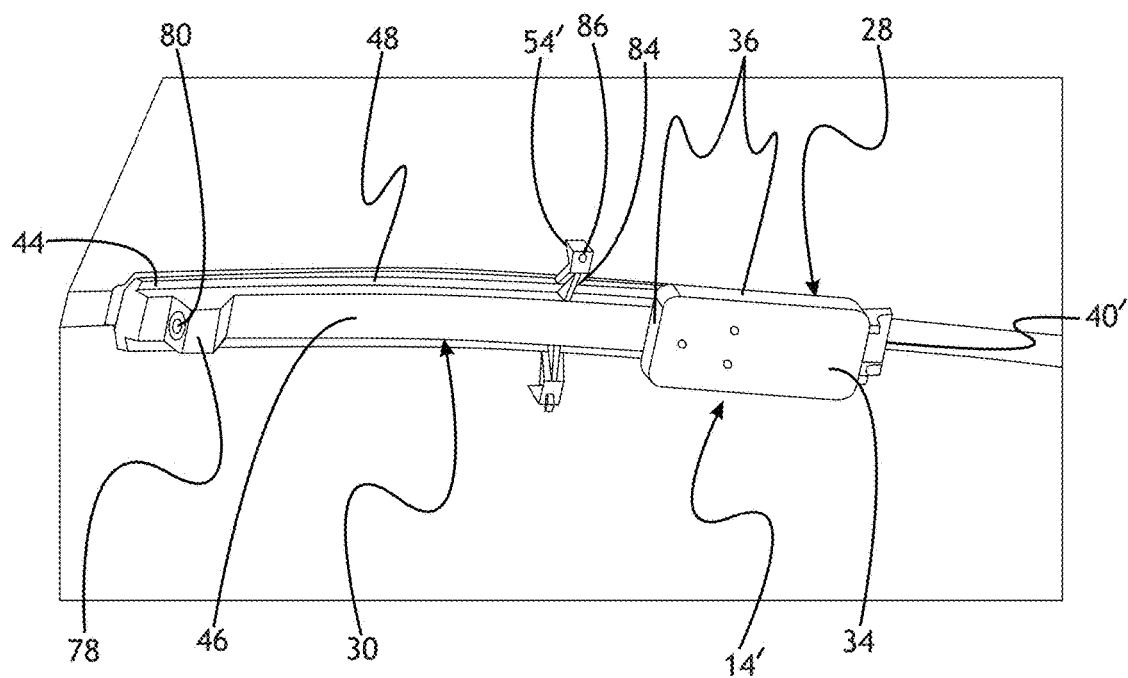
FIG. 4 is a perspective view of an implementation of a lamp housing.
Figure 7:
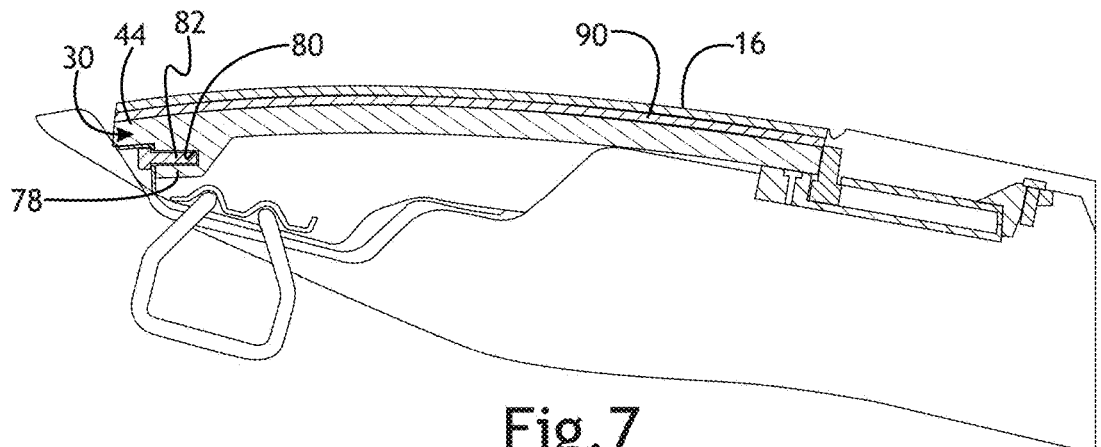
FIG. 7 is a cross sectional view of an implementation of a lamp housing.
Figure 8:
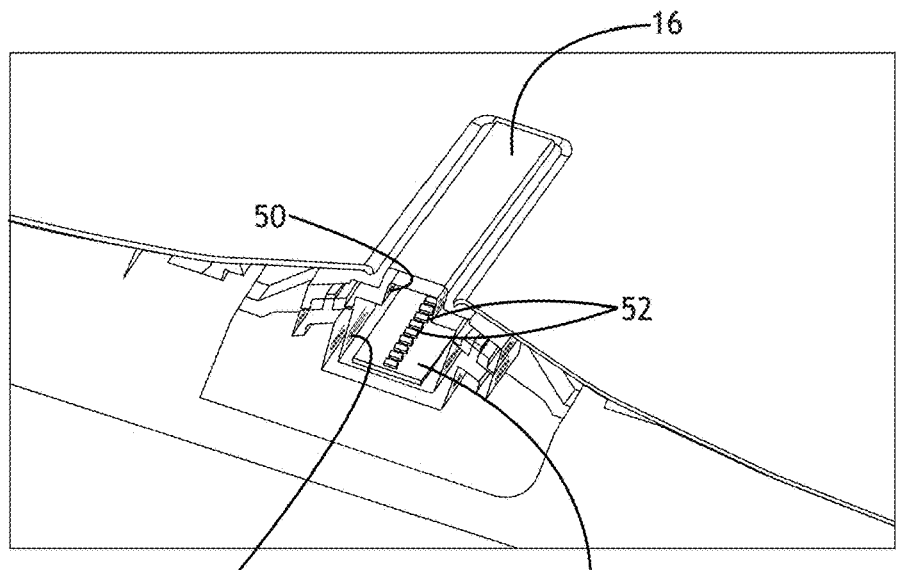
FIG. 8 is a perspective view of a vehicle hood, partially cut away showing an implementation of a lamp housing.

As best seen in FIGS. 4 and 7, the second housing section 30 includes a mounting block 78. The mounting block 78 may be disposed adjacent the distal end 44 of the second housing section 30. The mounting block 78 may be disposed on the base 46 of the second housing section 30 and depend therefrom. The mounting block 78 includes an opening 80 for receiving a fastener 82. In an implementation, the opening 80 has a female threaded bore for receiving the faster 82 which may comprise a bolt.

Figure 5:
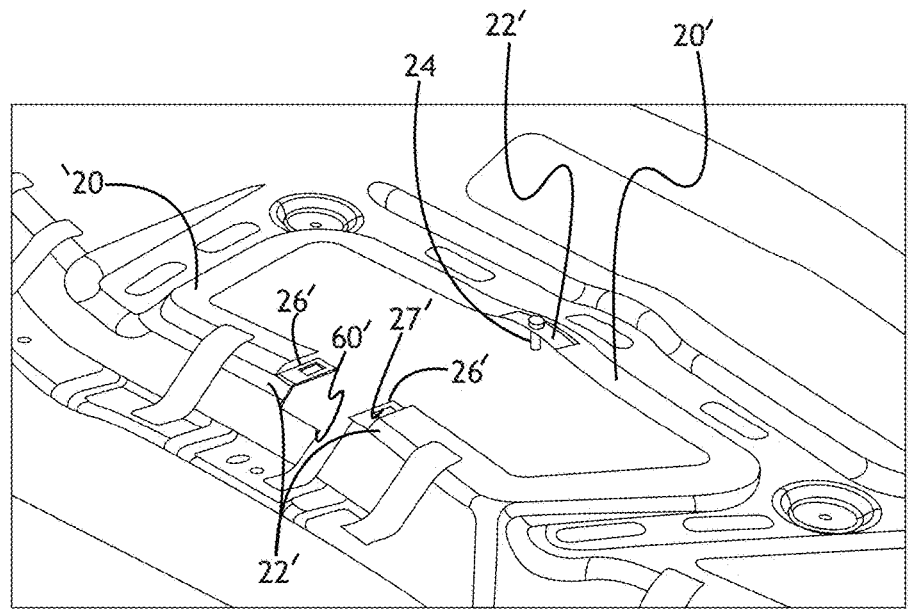
FIG. 5 is a perspective view of an implementation of a inner hood component.

In an implementation, the structural members 20' of the inner vehicle hood component 18' may be arranged such that the projections 26' of the mounting areas 22' may be arranged to be generally horizontal, as best seen in FIG. 5. Some of the mounting areas 22' include projections 26' which each include an opening 27' for receiving the first tab 54' to thereby clip the lamp housing 14' to the structural members 20'. This clip and bolt arrangement helps urge the lamp housing 14' toward the vehicle hood 10. As shown, the bolt 24 may be secured to one of the mounting areas 22'. The bolt 24 may be received within the opening 76.

The ramped surface 56 may help facilitate mounting of the lamp housing 14' with the structural members 20' of the inner vehicle hood component 18. The first tab 54' may be inserted through the openings 27' of the projections 26'. During connection of the lamp housing 14' with the structural members 20' of the inner vehicle hood component 18, the first tabs 54' are positioned below the projections 26'. A force can be applied to move the second housing section 30 upwardly toward the inner vehicle hood component 18. The relatively thinner end of the ramped surface 56 engages the projection 26'. As the ramped surface 56 is moved upwardly relative to the projections 26', the projection is urged or flexed slightly relatively to the first tab 54'. When the ramped surface 56 of the first tab 54' has passed through the opening 27', the projection 26' returns to its beginning state and the ledge 58 can engage the projection 26' to thereby releasably secure the first tab 54' with the projection 26'. With the connection made in this way, the first tab 54' and projection 26' form a clip which releasably connects the first tab 54' to the projection 26'. It will be appreciated that rather than the projection 26' flexing, the ramped surface 56 may urge the arm 84 toward the side wall 36 which in turn may flex the side wall 36 to allow the ramped surface 56 to be inserted through the opening 27' of the projection 26'. Yet further, it will be appreciated that both of the projection 26' and side wall 36 may flex to allow the ramped surface 56 of the first tab 54' through the opening 27'. Once the first tab 54' is inserted into the opening 27', the side wall 36 and projection 26' may return to their respective unbiased positions allowing the ledge 58 to engage the projection 26'.

The mounting block 78 may be used to secure the distal end 44 of the lamp housing 14' to the structural members 20' of the inner hood component 18. One of the mounting areas 22' of the structural members 20' may extend in a location so that it is adjacent the mounting block 78. The mounting area 22' may define an opening therethrough. A fastener 82, such as a bolt can pass through the opening in the mounting area 22' and be received withing the opening 80 of the mounting block 78. In this way, the distal end 44 of the second housing section 30 may be secured to the structural members 20' of the inner hood component 18.

The lamp housing 14, 14'; may also include a lens 16. The lens 16 may be positioned adjacent the cut out area 12 of the vehicle hood 10. The lens 16 may help disperse light therethrough from the lighting components 52. The lamp housing 14, 14' may also include a sealing member 90 positioned between the lens 16 and the second housing section 30. Another seal, not shown, may be position between the periphery of the lens 16 and the area of the vehicle hood 10 that surrounds the cut out area 12.

The lamp housing 14', which may contain the lighting components 52 in the second housing section 30 and the PCB 32 in the cavity of the first housing section 28 may be secured to the inner vehicle hood component 18 as follows. In an implementation, the second housing section 30 of lamp housing 14' can be positioned such that the first tabs 54' are adjacent the first projections 26' The first housing section 28 is positioned such that the opening 76 of the cylindrical body 74 is positioned adjacent the fastener 82 connected to the structural member 20'. The second housing section 30 is then moved to allow the ramped surfaces 56 of each of the first tabs 54' to flex the first projections 26'. The second housing section 30 is moved until the first tabs 54' are inserted through the openings in the first projections 26'. When in this position, the ledges 58 engage the respective projections 26' to clip the second housing section 30 into place. The distal end 44 of the second housing section 30 may be aligned such that the opening 80 of the mounting block 78 aligns with an opening in the structural member 20'. A fastener 82 may then be inserted through the opening of the of the structural member 20' and threaded into the opening 80 of the mounting block. Similarly, the bolt 24 passes through the hole 42 and a nut, not shown, may be used to secure the first housing section 28 to the structural member 20'. In an implementation, the hole 42 may have or be a female threaded hole, obviating the need for a nut. When installed in this manner, the lens 16 aligns with the cut out area 12 in the vehicle hood 10.

In order to remove the lamp housing 14' from the inner vehicle hood, the nut, not shown, is removed from the bolt 24. The fastener 83 is removed from the opening 80 in the mounting block 78 and the first projections 26' and or the first tabs 54' are manually flexed so as to disengage the first projections 26' from the ledge 58. The second housing section 30 is then moved such that the first tabs 54' are removed from the openings 27' in the projections 26.' In this manner, the lamp housing 14' is easily removed from the Inner vehicle hood component 18.

What is claimed is:

1. A lamp housing configured to be connected to a vehicle hood component comprising:
   a first housing section;
   a second housing section extending from the first housing section to a distal end, the second housing section comprising a channel defined by a base and at least one side wall extending transversely to the base, wherein the at least one side wall supports a first tab, the first tab is configured to be received in an opening of a projection on the vehicle hood component to thereby connect the lamp housing with the vehicle hood component, wherein the second housing section comprises a pair of side walls spaced apart from one another and extending from the base to define the channel, and each of the side walls supports a first tab that is configured to be received in openings of projections on a vehicle hood component.

2. The lamp housing as set forth in claim 1 wherein the first tabs each comprise a ramped surface and a ledge, the ramped surface being configured to contact a projection on a vehicle hood component to thereby flex at least one of the projection or side wall to insert the first tab into openings of a projection and engage the ledge with the projection to secure the first tab in the opening.

3. The lamp housing as set forth in claim 2 wherein each of the first tabs is supported on the side wall by an arm extending from the side wall.

4. The lamp housing as set forth in claim 1 wherein the first housing section includes a mounting flange extending outwardly therefrom in a direction different from the second housing extension, the flange including an opening configured to receive a fastener.

5. The lamp housing as set forth in claim 4 wherein the at least one side wall supports a second tab spaced from the first tab and adjacent the distal end, the second tab configured to be received in an opening of a projection on a vehicle hood component to thereby connect the lamp housing with a vehicle hood component.

6. The lamp housing as set forth in claim 4 wherein the second housing section includes a mounting block depending from the base adjacent the distal end, the mounting block including an opening configured to receive a fastener.

7. The lamp housing as set forth in claim 4 wherein the first housing section defines a cavity configured to receive electrical components.

8. The lamp housing as set forth in claim 7 wherein the second housing carries at least one lighting element and the cavity receives a printed circuit board, the printed circuit board being coupled with at least one lighting element.

9. The lamp housing as set forth in claim 8 wherein the at least one lighting element comprises a plurality of LED lamps.

10. The lamp housing as set forth in claim 1 further comprising a lens disposed over the channel and configured to be coupled with the side walls.

11. A lamp housing configured to be connected to a vehicle hood component comprising:
   a first housing section; and
   a second housing section extending from the first housing section to a distal end, wherein the first housing section defines a cavity configured to receive electrical components and the first housing section includes a mounting flange extending outwardly therefrom opposite to the direction of the second housing section, wherein the second housing section includes a channel defined by a base and a pair of side walls spaced apart from one another and extending transversely to the base, and having a mounting block depending from the base adjacent the distal end, and wherein each of the pair of side walls supports a first tab, the first tab configured to be received in an opening of a projection on a vehicle hood component to thereby connect the lamp housing with a vehicle hood component; and
   a lens disposed over the channel and configured to be coupled with the side walls.

12. The lamp housing as set forth in claim 11 wherein the first tabs each comprise a ramped surface and a ledge, the ramped surface configured to contact a projection on a vehicle hood component to thereby flex at least one of the projection or the side wall to insert the first tab into an opening of a projection and engage the ledge with the projection to secure the first tab in the opening.

13. The lamp housing as set forth in claim 12 wherein each of the first tabs is supported on the side wall by an arm extending from the side wall.

14. The lamp housing as set forth in claim 11 wherein a printed circuit board is received within the cavity of the first housing section.

15. The lamp housing as set forth in claim 14 wherein a plurality of LED lamps are received within the channel and are coupled with the printed circuit board.

16. A lamp housing, comprising:
   a first housing section having a receptacle configured to receive one or more electrical components;
   a second housing section extending from the first housing section to a distal end, the second housing section having a base and a first side wall extending along a first side of the base, and a second side wall extending along a second side of the base that is opposite to the first side, wherein each of the first side wall and the second sidewall supports a first tab, and each first tab is configured to be received in an opening of a corresponding one of two projections on a vehicle hood or a vehicle hood component to thereby connect the lamp housing with the vehicle hood or the vehicle hood component.

17. The lamp housing as set forth in claim 16 wherein the second housing carries at least one lighting element, and one or more of the one or more electrical components are couple to the at least one lighting element.

* * * * *